United States Patent [19]
Klundt et al.

[11] 3,876,679
[45] Apr. 8, 1975

[54] DI-SUBSTITUTED PHENETHYLCARBAMIC ACID ESTERS

[75] Inventors: Irwin L. Klundt, Brookfield; Robert Lenga, Milwaukee, both of Wis.

[73] Assignee: Aldrich Chemical Company, Inc., Milwaukee, Wis.

[22] Filed: Dec. 9, 1970

[21] Appl. No.: 96,587

[52] U.S. Cl. ......... 260/463; 260/239 A; 260/347.4; 260/471 C; 424/244; 424/285; 424/300
[51] Int. Cl............................................ C07c 125/06
[58] Field of Search ........................ 260/471 C, 463

[56] References Cited
UNITED STATES PATENTS
3,646,109  2/1972  Shavel, Jr. et al. ............. 260/471 C Primary Examiner—Lorraine A. Weinberger
Assistant Examiner—L. A. Thaxton
Attorney, Agent, or Firm—Robert L. Niblack; Joyce R. Krei; Vincent A. Mallare

[57] ABSTRACT

Novel di-substituted α-alkyl-β-phenethylamines and carbamic acid esters. The compounds are antidepressants and anti-hypertensive agents.

7 Claims, No Drawings

DI-SUBSTITUTED PHENETHYLCARBAMIC ACID ESTERS

This invention relates to novel di-substituted $\alpha$-alkyl-$\beta$-phenethylamines and carbamic acid esters represented by the formula

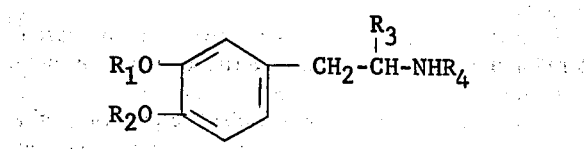

wherein:

$R_1$ and $R_2$ are the same or different members of the group consisting of hydrogen, lower alkoxycarbonyl, lower alkoxycarbamoyl, benzyl, substituted benzyl or lower alkanoyl; $R_3$ is lower alkyl; and $R_4$ is hydrogen or

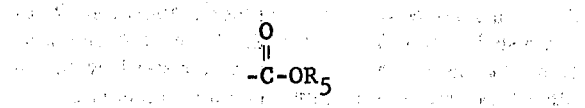

wherein $R_5$ is lower alkyl, lower alkenyl, lower alkynyl, lowerhaloalkyl, cyclopropylmethyl, $\beta$-(2-furyl)ethyl or azetidinyl, and when $R_4$ is hydrogen, the pharmaceutically acceptable acid addition salts thereof, with the limitation that when $R_1$ and $R_2$ are hydrogen, $R_4$ cannot be hydrogen.

"Lower alkenyl" refers to both straight and branched chain alkenyl groups containing from 2 to 5 carbon atoms, such as vinyl, allyl, methallyl, 1-pentenyl, and the like.

The term "lower alkyl" as used herein refers to both straight and branched chain $C_1$–$C_5$ alkyl groups including methyl, ethyl, n-propyl, iso-propyl, n-butyl, sec-butyl, tert-butyl, iso-butyl, n-pentyl, iso-pentyl, neo-pentyl, and the like.

"Lower alkynyl" refers to $C_2$–$C_5$ alkyl groups as defined above from which two hydrogen atoms have been removed from each of two adjacent carbon atoms to produce acetylenic unsaturation; e.g., ethynyl, propargyl, 2-butynyl, 1-pentynyl, and the like.

The term "lower alkoxy" refers to alkoxy groups having from 1 to 5 carbon atoms, e.g., methoxy, ethoxy, propoxy, butyroxy, etc.

"Substituted benzyl" refers to a mono-, di-, or tri-substituted benzyl moiety substituted in the ortho, meta or para positions by a chloro, fluoro, iodo, bromo, or trifluoromethyl atom.

"Lower alkanoyl" refers to alkanoyl groups having from 1 to 5 carbon atoms such as acetate, propionate, butyrate, and valerate.

"Halo" includes chloro, fluoro, bromo, and iodo.

"Pharmaceutically acceptable acid addition salts" refers to non-toxic acid addition salts which are generally prepared by reacting the amines of this invention with a suitable organic or inorganic acid. Representative salts include the hydrochloride, hydrobromide, sulfate, bisulfate, acetate, oxalate, valerate, oleate, laurate, borate, benzoate, lactate, phosphate, tosylate, citrate, maleate, fumarate, succinate, tartrate, and the like.

The compounds of this invention exhibit antidepressant activity in mice in the modified dopa test (Everett et al., Fed. Proc., 23, p. 198 (1964). The compounds are useful as antidepressant agents when administered to mammalian patients in dosages of from 25 to 200 mg/kg of body weight daily.

Compounds wherein $R_1$ and $R_2$ are hydrogen, benzyl, or substituted benzyl are additionally useful as intermediates in the synthesis of compounds wherein $R_1$ and $R_2$ are alkoxycarbonyl or alkoxycarbamoyl.

In addition to the antidepressant activity, the compound where $R_1$, $R_2$ and $R_4$ are ethoxycarbonyl and $R_3$ is methyl exhibits antihypertensive activity in rats and dogs and increases renal blood flow in dogs in dosages of from 60 to 200 mg/kg of body weight daily. The compound is thus additionally useful in the treatment of renal hypertension and shock.

The compounds are preferably administered to mammalian patients in dosages of from 25 to 200 mg/kg of body weight daily, preferably in divided dosages. While the compounds exhibit both oral and parenteral activity, the preferred route of administration in the treatment of depression and hypertension is the oral route. For treating shock, the parenteral route is the preferred route of administration.

Representative compounds of this invention include:
3,4-Dibenzyloxy-$\alpha$-methyl-$\beta$-phenethylcarbamic acid, ethyl ester
3,4-Dihydroxy-$\alpha$-methyl-$\beta$-phenethylcarbamic acid, ethyl ester
3,4-O,O-bis(ethoxycarbonyl)-$\alpha$-methyl-$\beta$-phenethylcarbamic acid, ethyl ester
3-Hydroxy-4-benzyloxy-$\alpha$-methyl-$\beta$-phenethylcarbamic acid, ethyl ester
3,4-Dihydroxy-$\alpha$-methyl-$\beta$-phenethylcarbamic acid, $\beta$-(2-furyl)ethyl ester
3,4-Dibenzyloxy-$\alpha$-ethyl-$\beta$-phenethylamine
3,4-O,O-bis(methoxycarbonyl)-$\alpha$-methyl-$\beta$-phenethylcarbamic acid, propargyl ester
3,4-Dihydroxy-$\alpha$-n-propyl-$\beta$-phenethylamine The compounds of this invention are prepared by well known procedures. Generally speaking, protocatechualdehyde (Aldrich Chemical Co.) is reacted with $R_1Cl$ (i.e., benzyl chloride). The resulting compound is converted to the corresponding $\beta$-methylnitrostyrene, by methods well known in the art, which is then treated with lithium aluminum hydride. The resulting amine is then converted to the corresponding isocyanate and then reacted with an appropriate alcohol. Removal of the catechol protecting group and treatment with an appropriate chloroformate or isocyanate yields the desired products.

The following examples further illustrate the present invention.

EXAMPLE 1

Preparation of
3,4-Dibenzyloxy-$\alpha$-Methyl-$\beta$-Phenethylcarbamic Acid, Ethyl Ester To 300 ml of chloroform containing 19.2 g (0.05 mole) of 3,4-dibenzyloxy-$\alpha$-methyl-$\beta$-phenethylamine (prepared according to U.S. Pat. No. 2,862,034) was added 11.1 g (0.11 mole) of triethylamine, followed by 5.4 g (0.05 mole) of ethyl chloroformate. The reaction was refluxed for three hours, cooled to room temperature, washed with water (2×200 ml) and dried over sodium sulfate. The chloroform was removed in vacuo leaving a yellow oil which rapidly solidified on standing. The solid was recrystallized from cyclohexane to yield 17.2 g (82%) of product as a white solid, m.p. 93°–95°.

Analysis Calcd. for $C_{26}H_{29}NO_4$: C,74.46; H,6.82; N,3.34
Found: C,74.14; H,7.11; N,3.36

EXAMPLE 2

Preparation of 3,4-Dihydroxy-α-Methyl-β-Phenethylcarbamic Acid, Ethyl Ester

To 300 ml of methanol was added 14.4 g of 3,4-dibenzyloxy-α-methyl-β-phenethylcarbamic acid, ethyl ester (prepared according to the method of Example 1) and 500 mg of 10% palladium on charcoal as a water-wetted paste. The reaction was hydrogenated at atmospheric pressure. The catalyst was filtered off and the solvent removed in vacuo leaving a syrup. The syrup was chromatographed through 900 g silica gel using ethyl acetate as the elutant. The first 600 ml contained no product. The next 800 ml contained 6.4 g (78%) of the product as a syrup which was dried under high vacuum overnight.

Analysis Calcd. for $C_{12}H_{17}NO_4$: C,60.25; H,7.11; N,5.86
Found: C,60.19; H,6.94; N,5.54

EXAMPLE 3

Preparation of 3,4-Dicarbethoxy-α-Methyl-β-Phenethylcarbamic Acid, Ethyl Ester

To 100 ml chloroform was added 5.2 g (0.0218 mole) of 3,4-dihydroxy-α-methyl-β-phenethylcarbamic acid, ethyl ester (prepared according to the method of Example 2), followed by 4.8 g (0.0436 mole) of ethyl chloroformate. To the reaction was added dropwise 4.4 g (0.0436 mole) of triethylamine in 20 ml of chloroform. The reaction was refluxed overnight. The solution was washed with water (2×200 ml) and dried. Evaporation of the chloroform in vacuo gave a yellow syrup which solidified upon standing. The solid was dissolved in 350 ml of hot cyclohexane containing 20 ml of benzene to yield 6.9 g of product as a white solid, m.p. 113°–115°.

Analysis Calcd. for $C_{18}H_{25}NO_8$: C,56.38; H,6.53; N,3.65
Found: C,56.52; H,6.55; N,3.72

The compounds useful in the practice of the present invention are generally formulated into pharmaceutical compositions comprising, as an active ingredient, at least one of the active agents in association with a pharmaceutical carrier or diluent. The compounds useful in the practice of the invention exhibit both oral and parenteral activity and can be formulated in dosage forms for oral, or parenteral administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate, sweetening and flavoring agents, and the like. In the case of capsules, for example, the active agent may be the sole ingredient.

Liquid dosage forms for oral administration include, pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents, and sweetening, flavoring and perfuming agents.

Preparation according to this invention for parenteral administration include sterile aqueous or non-aqueous solutions, suspensions or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment.

We claim:
1. A compound of the formula

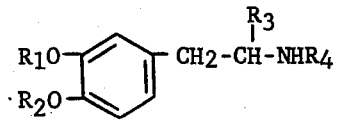

wherein $R_1$ and $R_2$ each are lower alkoxy carbonyl or benzyl, $R_3$ is lower alkyl and $R_4$ is

$R_5$ being lower alkyl, lower alkenyl, lower alkynyl, cyclopropylmethyl or lower haloalkyl.

2. A compound in accordance with claim 1 wherein $R_1$ and $R_2$ are alkoxy carbonyl and $R_5$ is lower alkyl.
3. A compound in accordance with claim 1 wherein $R_1$ and $R_2$ are benzyl.
4. A compound in accordance with claim 1 wherein $R_3$ is methyl.
5. A compound in accordance with claim 1 wherein $R_3$ is methyl and $R_5$ is ethyl.
6. A compound in accordance with claim 1: 3,4,-O,O-bis(ethoxycarbonyl)-α-methyl-β-phenethylcarbamic acid, ethyl ester.
7. A compound in accordance with claim 1: 3,4-dibenzyloxy-α-methyl-β-phenethylcarbamic acid, ethyl ester.

* * * * *